(12) United States Patent
Röder et al.

(10) Patent No.: US 7,232,274 B2
(45) Date of Patent: Jun. 19, 2007

(54) SAFETY MEANS FOR A VERTICAL CONNECTION OF TWO MEMBERS

(75) Inventors: Heinrich Röder, Elizabethweg 5, 85737 Ismaning (DE); Franz Maier, Hohenkammer (DE); Max Grill, Grafrath (DE)

(73) Assignee: Heinrich Roder, Ismaning (DE)

( * ) Notice: Subject to any disclaimer, the term of this patent is extended or adjusted under 35 U.S.C. 154(b) by 0 days.

(21) Appl. No.: 10/814,086

(22) Filed: Mar. 31, 2004

(65) Prior Publication Data

US 2004/0202509 A1  Oct. 14, 2004

(30) Foreign Application Priority Data

Apr. 14, 2003  (DE)  ............... 103 17 161

(51) Int. Cl.
*F16D 9/00*  (2006.01)
(52) U.S. Cl. .............. 403/2; 403/341; 403/344; 248/317; 248/324
(58) Field of Classification Search ........ 248/317, 248/323, 324, 289.11, 291.1; 403/289, 310, 403/341, 344, 2
See application file for complete search history.

(56) References Cited

U.S. PATENT DOCUMENTS

| | | | | |
|---|---|---|---|---|
| 3,159,047 A | * | 12/1964 | Dable | ............ 74/450 |
| 3,838,987 A | * | 10/1974 | Draut | ............ 29/426.2 |
| 4,175,405 A | * | 11/1979 | Smith et al. | ............ 464/81 |
| 5,269,572 A | * | 12/1993 | Mefferd | ............ 285/330 |
| 5,490,652 A | | 2/1996 | Martin | |
| 6,616,112 B1 | * | 9/2003 | Tseng | ............ 248/342 |
| 6,824,471 B2 | * | 11/2004 | Kamenov | ............ 464/182 |
| 2003/0175113 A1 | | 9/2003 | Miwata et al. | |

FOREIGN PATENT DOCUMENTS

| | | |
|---|---|---|
| DE | 36 19 048 A1 | 6/1986 |
| DE | 197 32 212 A1 | 7/1997 |
| DE | 100 02 974 A1 | 1/2000 |
| DE | 200 21 708 U 1 | 12/2000 |

* cited by examiner

*Primary Examiner*—Daniel P. Stodola
*Assistant Examiner*—Michael P. Ferguson
(74) *Attorney, Agent, or Firm*—Butzel Long

(57) ABSTRACT

A locking device is provided in order to prevent a ceiling-mounted stand comprising one or two arms and one stand head and being part of a ceiling-mounted medical supply unit from falling down should a pivot connection of two arms tear apart. The locking device comprises at least two shell segments (1) that reach around the pivot connection and are provided with a first and a second segment end (3, 4) and with an upper and a lower edge (5, 6) adjacent to each of which an engaging section (7, 8) facing the pivot connection is provided, as well as an upper and a lower washer (9, 29) that is assembled of at least first and second washer segments (11, 12) that are, in the installed state, connected to the pivot connection above and below said pivot connection, whereby the washer segments each comprise engaging sections (13, 14) that are associated with the engaging sections (7, 8) of the shell segments.

14 Claims, 3 Drawing Sheets

SAFETY MEANS FOR A VERTICAL CONNECTION OF TWO MEMBERS

BACKGROUND OF THE INVENTION

1. Field of the Invention

The present invention relates to a locking device for a vertical connection of two components, in particular for a pivot connection of ceiling-mounted medical supply units, in particular of ceiling-mounted medical stands.

2. Description of the Related Art

Ceiling-mounted medical stands are provided for overhead mounting of medical equipment, such as medical monitors, respirators, syringe pumps, etc. They are, for example, used in operating rooms or intensive-care units, etc. for accommodation of the systems required for operations, intensive care or examination of a patient. Since all of the supply lines for electric current, compressed air, oxygen, and other medical gases, etc. can be routed from the ceiling into the ceiling-mounted stands where they can be connected directly to the equipment, the necessity of placing the cables on the floor is avoided and the risk of stumbling over cables that are lying on the floor can, thus, be eliminated.

Ceiling-mounted stands consist of a column and at least one horizontal swinging arm that are mounted to the ceiling via a pivot connection such that they can be turned, and of an equipment carrier, also called stand head, that is provided to accommodate the necessary connections and devices. The pivoted arm permits the ceiling-mounted stand to be swung across any radius desired, thus facilitating access the patient or adjustment of an optimum working position. Coming out of the ceiling, all cables and supply lines are routed down into the ceiling-mounted stand where they are placed and from where they are routed through the pivot connection and the arm and to the stand head. The ceiling-mounted stand may also comprise two arms that are coupled to each other such that they can be pivoted.

The pivot connections must be able to carry the total weight of the ceiling-mounted stand, including the stand head and the equipment accommodated therein. Any tearing apart of the pivot connection must, under any and all circumstances, be avoided since, otherwise, the ceiling-mounted stand would fall down, maybe causing considerable personal injury and material damage.

BRIEF SUMMARY OF THE INVENTION

Therefore, the present invention aims at providing a locking device that reliably prevents the ceiling-mounted stand from falling down. Furthermore, the locking device should also be capable of being retrofitted to already existing systems without any considerable effort.

According to the invention, this problem is solved by means of a locking device that is discussed below.

By forming the shell in individual shell segments and the washer in individual washer segments, it is also possible to retrofit the locking device without having to separate the cables and supply lines. Should retrofitting be necessary, the first step simply comprises sideward insertion of the washer segments above and below the pivot connection and fixing same via mounting screws of the pivot connection.

The engaging section of the shell segments comprises, to advantage, a ring segment section that is bent from the upper or lower edge at an essentially right angle. Thereby, each shell segment can be fitted sideways onto the pivot connection in the manner of a clamp, with the upper and lower ring segment sections simply engaging above and below the washer respectively, thus securing the pivot connection against falling apart.

The engaging section of the washer segment is formed as a stepped projection protruding from the outer perimeter of the washer segment, thus ensuring easy mounting of the shell segments. Furthermore, the manufacture of such washer segments is simple and cost-effective.

By the engaging section of the shell segment and the engaging section of the washer segment extending along the entire perimeter, the force to be absorbed in the event of the pivot connection tearing apart is distributed over a maximum area, so that the wall thickness of the engaging section can be kept small. Thereby, it is possible to design the locking device in a discreet manner.

BRIEF DESCRIPTION OF SEVERAL VIEWS OF THE DRAWINGS

The invention will be illustrated in detail below by means of a presently preferred embodiment with reference being made to the enclosed drawings, in which.

DETAILED DESCRIPTION OF THE INVENTION

Figure 1:
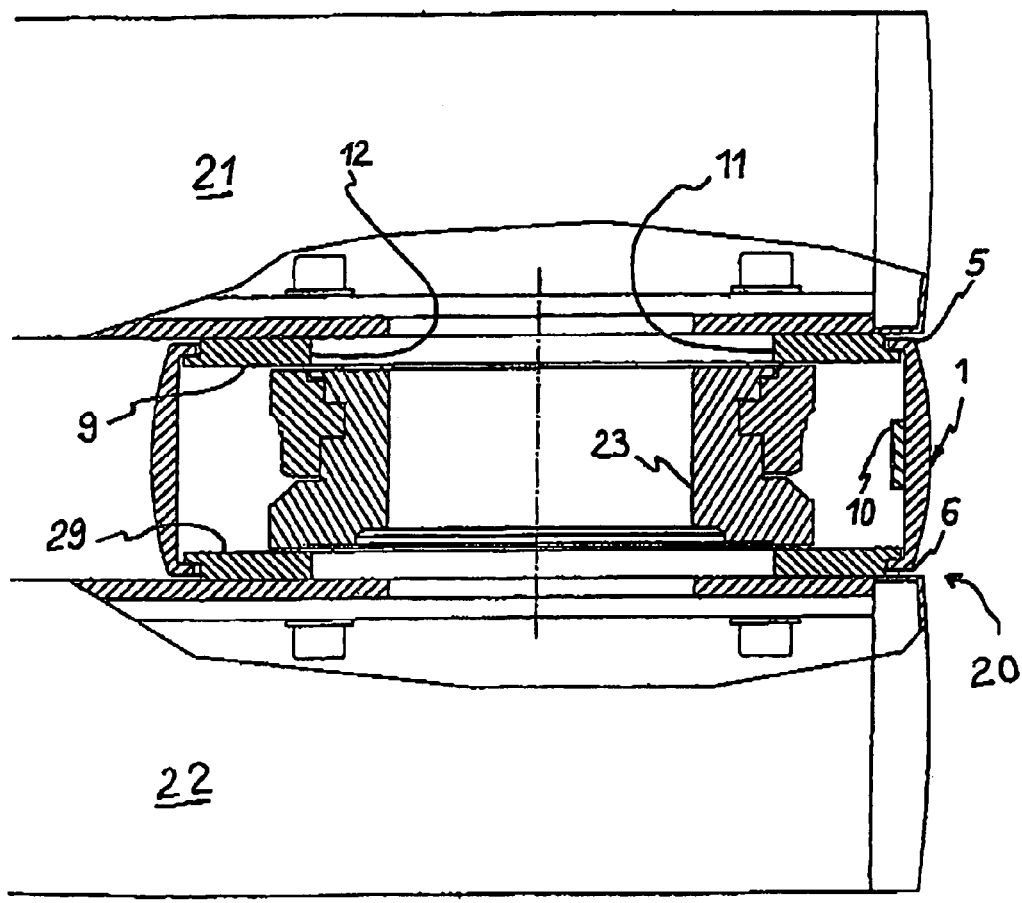
FIG. 1 is a partially broken lateral view of a pivot connection and two arms.

FIG. 1 indicates an upper arm 21 extending in horizontal direction and a lower arm 22 extending in horizontal direction, with both arms being connected to each other via a vertical pivot connection 20 such that they can be turned. The pivot connection 20 comprises a hub 23 that is surrounded by two further cylindrical components not described in detail here. The hub 23 is formed as a hollow cylinder. The supply cables and tubes (not shown here) are placed in said hollow cylinder. The pivot connection 20 as such will, however, not be considered in more detail below.

In the present embodiment, the locking device for the pivot connection 20 is formed by two shell segments 1 enveloping the pivot connection and associated upper and lower washers 9 and 29 that are likewise arranged around the pivot connection.

Figure 2:
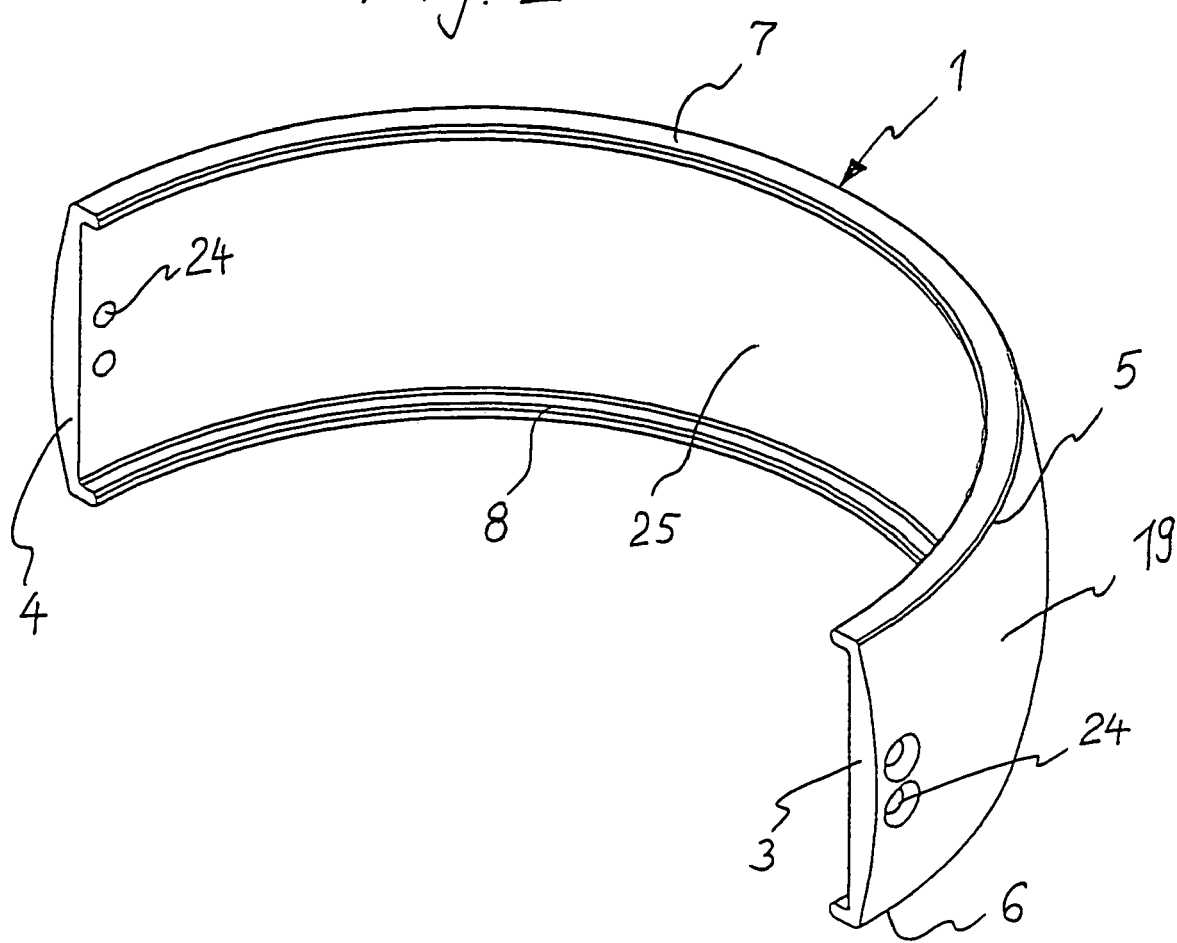
FIG. 2 is a perspective view of a shell segment.

FIG. 2 shows a shell segment 1. Since it is designed identically, the second shell segment will not be described in more detail here. As seen from above, the shell segment 1 has a semicircular shape. It possesses a shell segment surface 19 comprising a first free segment end 3 in circumferential direction and a second free segment end 4 arranged diametrically opposite to the first segment end. When installed as shown in FIG. 1, the shell segment comprises an upper edge 5 facing the upper arm 21 as well as an opposite lower edge 6 facing the lower arm 22. An upper projection is arranged at a right angle adjacent to the upper edge 5. Said projection extends inwards along the entire upper edge 5 in radial direction, thus forming a continuous engaging section 7. Likewise, a projection forming an engaging section 8 directed inwards in radial direction is arranged adjacent to the lower edge 6, also at a right angle. This radial projection extends inwards for only a few millimeters. However, the projection is dimensioned such that, by engaging the washer segments described below, it would be capable of reliably holding the weight of the ceiling-mounted stand and the equipment, should the pivot connection 20 tear apart. In the area of the segment end 3, two holes 24 through which screws can be fitted are provided in the shell segment surface 19. Two holes 24 are alos provided at the other segment end 4.

Figure 3:
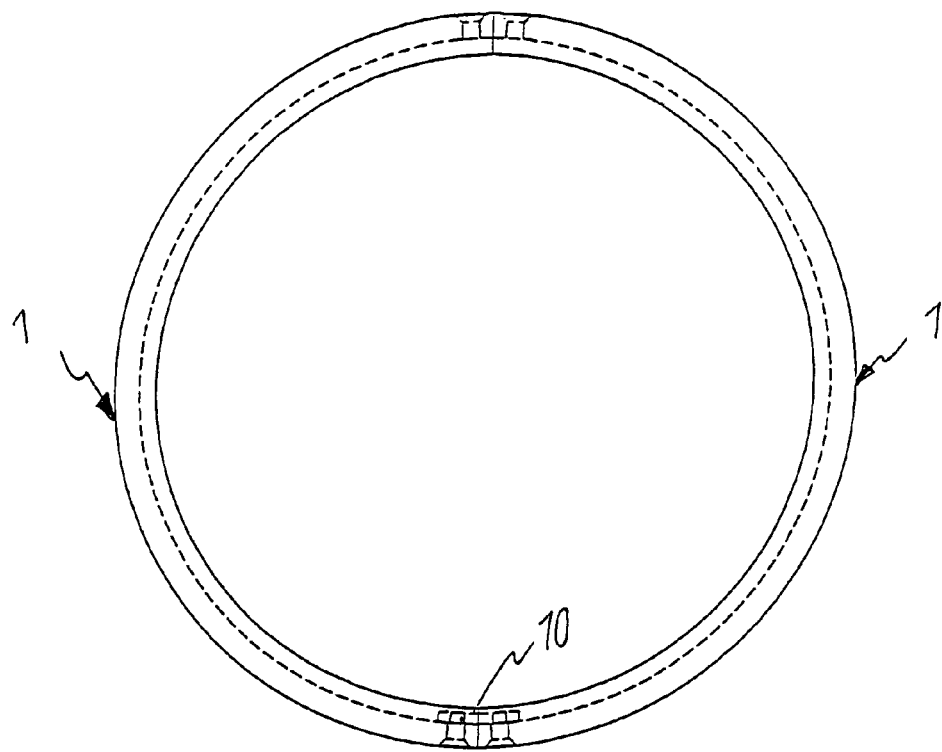
FIG. 3 is a top view of two shell segments that are joined to form a ring.

As shown in FIG. 3, two shell segments 1 are joined to form a ring. The two shell segments 1 are connected to each other via a connection element 10 at either of the free segment ends 3 and 4. The connection element 10 consists of a plate provided with two holes corresponding to the holes 9. In the present executive form, the holes of the connection element 10 are provided with internal threads so that screws can be screwed into the connection element. It is, however, also possible to provide unthreaded holes. In this case, the screws are screwed to each other by means of a nut.

According to FIG. 1, a washer 9 facing the upper arm 21 and a washer 29 facing the lower arm 22 are provided. Since both washers are identical, only the upper washer 9 will be described in more detail below, with reference being made to FIG. 4.

Figure 4:
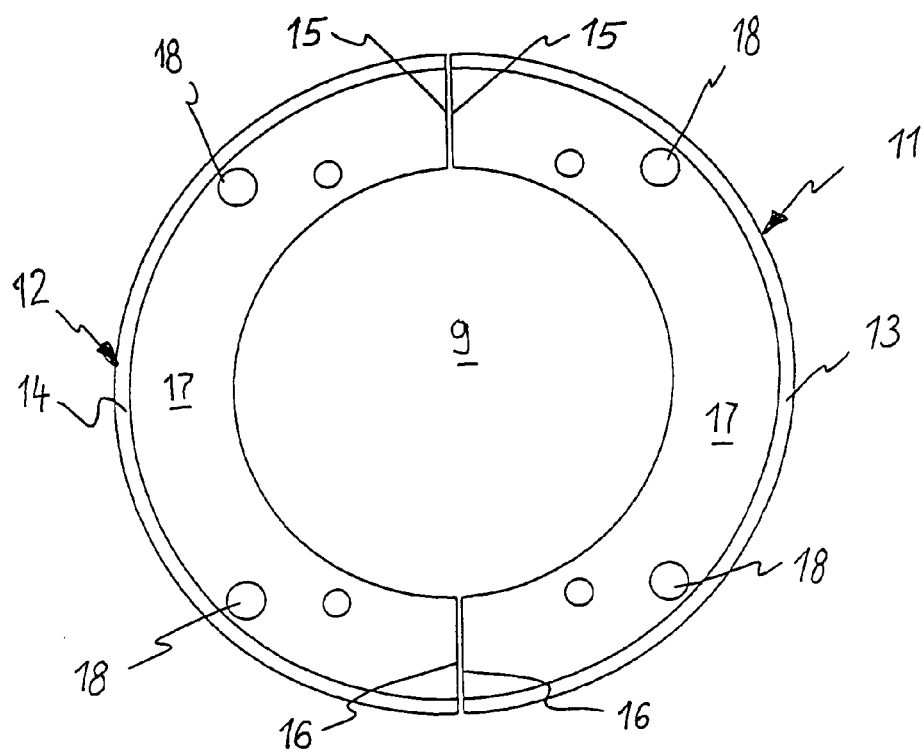
FIG. 4 is a top view of two washer segments that are joined to form a ring.

According to FIG. 4, two washer segments 11 and 12 are jointed to form an approximately closed washer 9. As seen from above, the two washer segments each have a semicircular shape. They are designed in the form of a flat disk, comprising a first free washer end 15 in circumferential direction, a second washer end 16 arranged diametrically opposite to the first washer end 15, a circular surface 17, an inner perimeter side and an outer perimeter side. Several holes 18 through which screw bolts (that are not shown here) are fitted for mounting the washer segments to the pivot connection are provided in the circular surface 17. In the present embodiment, two holes are provided for each washer segment.

As shown in FIG. 4 and in FIG. 1, each washer segment 11, 12 possesses a projection that protrudes outwards in radial direction and is used as engaging section 13. 14. The wall thickness of each projection is less than the wall thickness of the washer segment. In the present embodiment, the wall thickness of the projection is about half the wall thickness of the washer segment. However, the projection is dimensioned such that, by engaging the engaging sections 7, 8 of the shell segments 1, it would be capable of reliably holding the weight of the ceiling-mounted stand and the equipment, should the pivot connection 20 tear apart. The size of the projection in radial direction is dimensioned such that its radial dimension is approximately equal to the radial dimension of the engaging section 7, 8 of the shell segment 1.

In the assembled state according to FIG. 1, the engaging segment 7, 8 of each shell segment 1, thus, protrudes behind the radial projection of the engaging section 13, 14 of each washer segment 11, 12, both at the upper edge 5 and the lower edge 6.

In the event of the pivot connection 20 tearing apart, the ceiling-mounted stand or parts thereof are prevented from falling down because, in such a case, the engaging sections 7, 8 of the two shell segments 1 come into engagement with the engaging sections 13, 14 of the washers 9 and 29, thus holding the pivot connection together. More accurately, the upper engaging section 7 is held by the projection of the upper washer 9, while the lower engaging section 8 holds the projection of the lower washer 29.

Retrofitting of the locking device will be described in the following. At first, screw bolts securing the pivot connection 20 are unscrewed and pulled out. Then the washer segments 11, 12 of the upper and lower washers 9 and 29 are inserted sideways above and below the pivot connection 20. Thereafter, new screw bolts that are longer by the thickness of the particular washer segments are fitted through the holes 18 on the circular surface 17 of the washer segments and retightened subsequently. In this manner, the washer segments 11, 12 are fixed to the pivot connection 20.

Now, the shell segments 1 are fitted onto the pivot connection 20 from the side and are connected to each other via the connection element 10 and the associated screws. As a result, the shell segments 1 envelop the pivot connection. Hereby, the engaging sections 7, 8 of the shell segments 1 engage the engaging section 13, 14 of the washer segments 11, 12, thus securing the pivot connection in the manner of a clamp.

What is claimed is:

1. A locking device for vertical connection of an upper connection component, that comprises an upper engaging section, to a lower connection component, that comprises a lower engaging section, the locking device comprising a primary connection including a hub that rotatably connects the upper and lower connection components; and secondary connection that rotatably connects the upper and lower connection components in the event the primary connection fails, the secondary connection including at least two shell segments (1) each of which only partially extends around opposite vertical sides of the primary connection from the outside and in a horizontal direction, with the shell segments (1) comprising upper and lower terminal axial edges (5, 6) at each respective end of the shell segments adjacent to each of which are provided upper and lower engaging sections (7, 8) facing upper and lower engaging sections (13, 14) of the upper and lower connection components so that, should the primary connection of the two connection components fail the upper engaging section (7) of the shell segments (1) is supported against the upper engaging section (13, 14) provided at the upper connection component, while the lower engaging section (8) of the shell segments (1) holds the lower engaging section (13, 14) of the lower connection component, said locking device further comprising an upper and a lower washer (9, 29), each being comprised of at least first and second washer segments (11, 12), the washer segments being configured so that each can be pushed onto the connection from the outside and in said horizontal direction, whereby, when installed, the upper washer (9) is fixed to the upper connection component and the lower washer (29) to the lower connection component, whereby the upper and lower engaging sections (13, 14) are each formed on the respective washer segments (11, 12) of the upper and lower washers.

2. A locking device according to claim 1, wherein the shell segments (1) are connected to each other in an installed state.

3. A locking device according to claim 1, wherein the engaging sections (7, 8) of each shell segment (1) are each formed by a projection that is bent from the upper or lower terminal axial edge (5, 6) at an essentially right angle.

4. A locking device according to claim 1, wherein the engaging section (13, 14) of each washer segment (11, 12) is formed by a projection protruding from the outer perimeter of said washer segment.

5. A locking device according to claim 4, wherein the projection protruding from the outer perimeter is stepped.

6. A locking device according to claim 4, wherein the engaging section (13, 14) of each washer segment (11, 12) extends along the entire outer perimeter.

7. A locking device according to claim 1, wherein the engaging sections (7, 8) of each shell (1) extend along the entire upper or lower terminal axial edge (5, 6).

8. A ceiling-mounted medical supply unit having a locking device for vertical connection of an upper connection component which locking device comprises an upper engaging section, to a lower connection component, that comprises a lower engaging section, the locking device comprising a primary connection including a hub that rotatably connects the upper and lower connection components, wherein an axial passageway is provided within the hub for routing supply lines therethrough; and secondary connection that rotatably connects the upper and lower connection components in the event the primary connection fails, the secondary connection including at least two shell segments (1) each of which only partially extends around opposite vertical sides of the primary connection from the outside and in a horizontal direction, with the shell segments (1) comprising an upper and a lower axial edge (5, 6) at each respective end of the shell segments, adjacent to each of which is provided an upper and a lower engaging section (7, 8) facing upper and lower engaging sections (13, 14) of the upper and lower connection components so that, should the primary connection of the two connection components fail, the upper engaging section (7) of the shell segments (1) is supported against the upper engaging section (13, 14) provided at the upper connection component, while the lower engaging section (8) of the shell segments (1) holds the lower section (13, 14) of the lower connection component, said locking device further comprising an upper and a lower washer (9, 29), each being comprised of at least first and second washer segments (11, 12), the washer segments being configured so that each can be pushed onto the connection from the outside and in said horizontal direction, whereby, when installed, the upper washer (9) is fixed to the upper connection component and the lower washer (29) to the lower connection component, whereby the upper and lower engaging sections (13, 14) are each formed on the respective washer segments (11, 12) of the upper and lower washers.

9. A ceiling-mounted medical supply unit according to claim 8, wherein the shell segments (1) are connected to each other in an installed state.

10. A ceiling-mounted medical supply unit according to claim 8, wherein the engaging sections (7, 8) of each shell segment (1) are each formed by a projection that is bent from the upper or lower axial edge (5, 6) at an essentially right angle.

11. A ceiling-mounted medical supply unit according to claim 8, wherein the engaging section (13, 14) of each washer segment (11, 12) is formed by a projection protruding from the outer perimeter of said washer segment.

12. A ceiling-mounted medical supply unit according to claim 11, wherein the projection protruding from the outer perimeter is stepped.

13. A ceiling-mounted medical supply unit according to claim 11, wherein the engaging section (13, 14) of each washer segment (11, 12) extends along the entire outer perimeter.

14. A ceiling-mounted medical supply unit according to claim 8, wherein the engaging sections (7, 8) of each shell segment (1) extend along the entire upper or lower axial edge (5, 6).

* * * * *